Patented Sept. 23, 1930

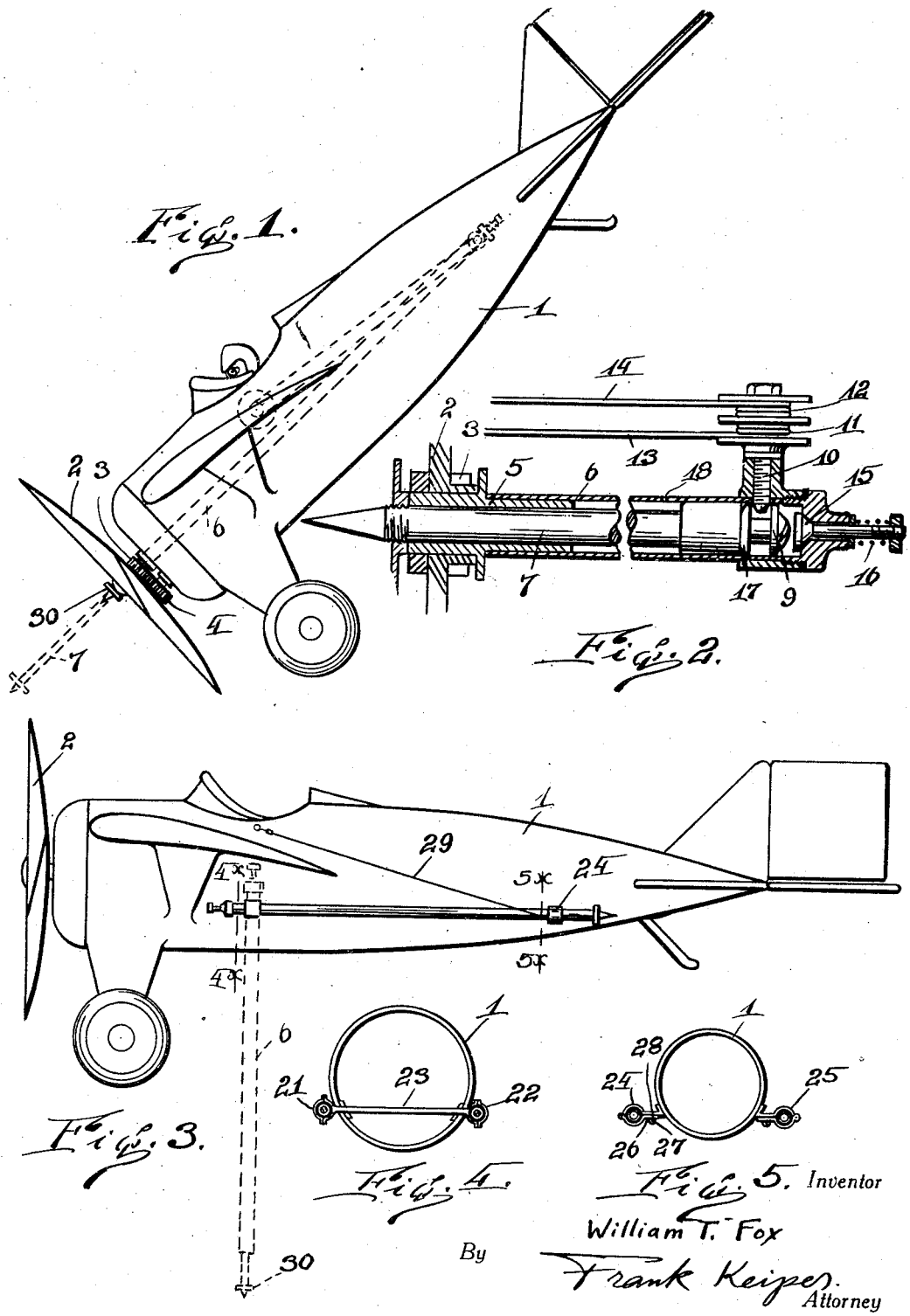

1,776,766

UNITED STATES PATENT OFFICE

WILLIAM T. FOX, OF ROCHESTER, NEW YORK; GERTRUDE M. LAVIN AND FRANK C. SMITH EXECUTORS OF SAID WILLIAM T. FOX, DECEASED

SHOCK ABSORBER

Application filed May 5, 1928. Serial No. 275,295.

The object of this invention is to provide a new and improved shock absorber for flying machines to be used more especially to cushion the blow with which the flying machine strikes the ground when it takes a nose dive.

This and other objects of the invention will be illustrated in the drawings, described in the specification and pointed out in the claims at the end thereof.

In the drawings:

Figure 1 is a side elevation of the flying machine in a descending position.

Figure 2 is a longitudinal section through the shock absorber.

Figure 3 is a side elevation of the flying machine with the shock absorbers applied to the sides of the machine.

Figure 4 is a section on the line $4^x$ $4^x$ of Figure 3.

Figure 5 is a section on the line $5^x$, $5^x$ of Figure 3.

In the drawings like reference numerals indicate like parts.

In the drawings reference numeral 1 indicates the flying machine having a propeller 2 thereon driven by a gear 3 which in turn is driven by a pinion 4 which is driven by an engine shaft and engine in the usual way. The propeller and gear are carried on the sleeve 5 which is stationary, the propeller and gear revolving around or on the sleeve as a bearing. This sleeve is supported by the cylinder 6 which is carried on the frame of the flying machine and suitably anchored to it. In the cylinder 6 and sleeve 5 is provided a plunger 7. On the rear of this plunger is provided a collar 9 which is engaged by a screw 10 by which the plunger is held normally in the position shown in Figure 2. On this screw is provided the pulleys 11 and 12 by which the screw 10 is turned in to engage the collar 9 or is turned out to disengage the collar and release the plunger. The rope 13 is wound one way around the pulley 11 and the rope 14 is wound the other way around the pulley 11. By pulling on the rope 13 the screw is turned up to disengage the plunger and by pulling on the rope 14 the screw is turned down to engage the plunger.

When the flying machine takes the position shown in Figure 1, the pilot can pull on the rope 13 and release the plunger 7 which can then move out by gravity. The more the flying machine comes to a vertical position or in other words, the nearer it comes to making a nose dive, the faster the plunger will move out. If necessary the outward movement of the plunger may be assisted by blowing compressed air into the cylinder back of the plunger.

In the absence of compressed air, however, a valve 15 is provided which is normally held on its seat by a spring 16. This valve opens as the plunger runs out in the cylinder and the plunger then draws air in past the valve so that the cylinder is filled with air as the plunger moves out.

When the machine reaches the ground, the plunger 7 strikes the ground first and is driven into the cylinder or the cylinder moves down on it compressing the air that is inside of the cylinder. For this purpose a packing 17 is provided on the plunger which makes an air tight fit with the cylinder so as to compress the air in the cylinder, and the compression of the air slows down the flying machine so that it reduces the shock or impact with which it strikes the ground. The cylinder 6 is provided with a vent 18 which lets out some of the air as the pressure rises in the cylinder so as to further reduce the force of the impact with which the machine strikes. This vent is placed a suitable distance from the rear end of the cylinder so that when the packing on the plunger passes the vent no more air can escape and thereafter all the air will be compressed to reduce the shock of the machine.

In Figures 3 and 4 I have shown a pair of shock absorbers 21 and 22 mounted on a shaft 23 which shaft is mounted in the body of the machine 1. The shock absorbers are mounted to swing on this shaft. The free end of each of the shock absorbers is supported in the cradles 24, 25, the lower side of each of which cradles is pivoted to the upper side so that the cradles can open to drop the free end of the shock absorber. Each of the lower sides of the cradles is perforated with a slot 26 to permit a tongue 27 to pass therethrough which tongue is carried on the upper stationary half of the cradle. The lower half of the cradle is held in place by a pin 28 which passes through a hole in the tongue 27. When the pilot wishes to use the shock absorber he pulls out the pins 27 which permits the cradles to open and allow the free ends of the shock absorbers to swing down after which the plungers will move out to the extended position so that the shock absorbers can function in the manner above described. To permit the pins 27 to be drawn out from the cradles cables 29 are provided therefor which are within reach of the pilot.

To prevent the plunger from being driven into the ground when it strikes the ground the plunger is provided with the collar 30 which has a broad bearing surface which prevents it from sinking into the ground more than a very short distance.

In order to increase the pressure in the cylinders of the shock absorbers, a small high pressure air tank may be carried by the airplane and this tank connected to the cylinders of the shock absorbers at the head thereof with a suitable check valve and controlling valve in the connecting pipe line so that the air pressure from the high pressure tank into the cylinders of the shock absorbers can be controlled.

I claim:

1. A shock absorber comprising a cylinder fastened in the body of a flying machine, a plunger mounted to slide in said cylinder, a sleeve surrounding said plunger, a propeller mounted to rotate on said sleeve and means to rotate the propeller around said sleeve.

2. A shock absorber comprising a cylinder fastened in the body of a flying machine, a plunger mounted to slide in said cylinder, a sleeve surrounding said plunger, a propeller mounted to rotate on said sleeve, a gear wheel fastened to the hub of said propeller, an engine shaft parallel to said sleeve, a pinion on said shaft meshing with the gear on the propeller.

3. A shock absorber comprising a cylinder fastened in the body of a flying machine, a plunger mounted to slide in said cylinder, a sleeve surrounding said plunger, a propeller mounted to rotate on said sleeve and means to rotate the propeller around said sleeve, a collar on the rear end of said plunger, a screw engaging said collar, a pulley to rotate said screw to release said collar and plunger.

4. A shock absorber comprising a cylinder fastened in the body of a flying machine, a plunger mounted to slide in said cylinder, a sleeve surrounding said plunger, a propeller mounted to rotate on said sleeve and means to rotate the propeller around said sleeve, a collar on the rear end of said plunger, a screw engaging said collar, a pulley to rotate said screw to release said collar and plunger, a rope wound on said pulley adapted to rotate it on the pulling of the rope.

In testimony whereof I affix my signature.

WILLIAM T. FOX.